(No Model.)
F. H. BOLTE.
CRANK SECURING MEANS.
No. 483,342. Patented Sept. 27, 1892.
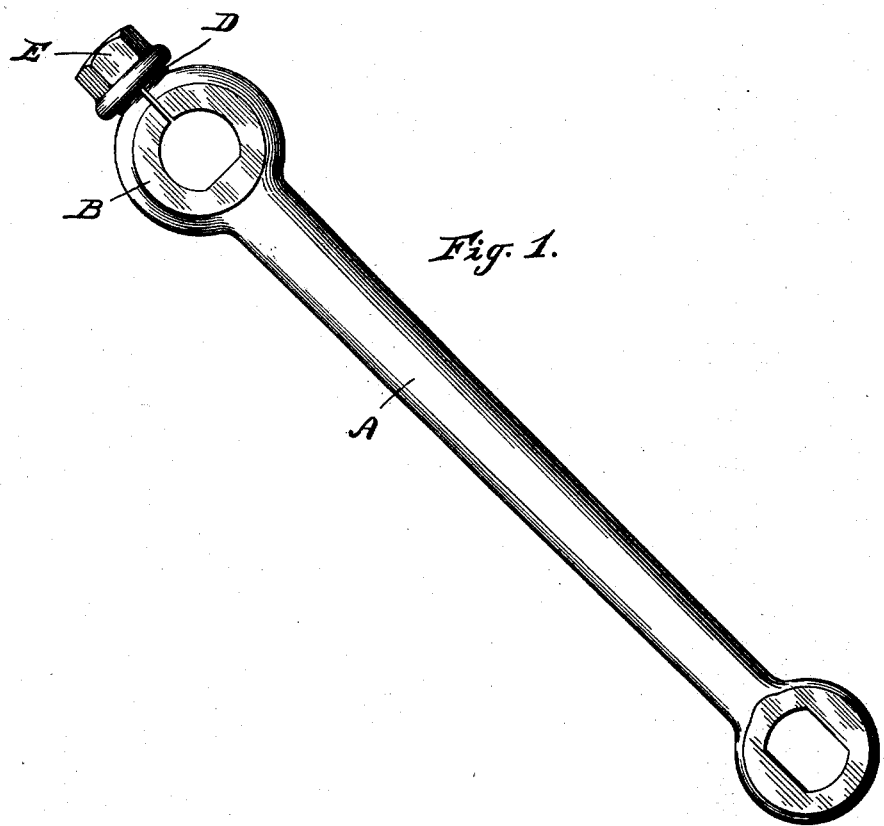
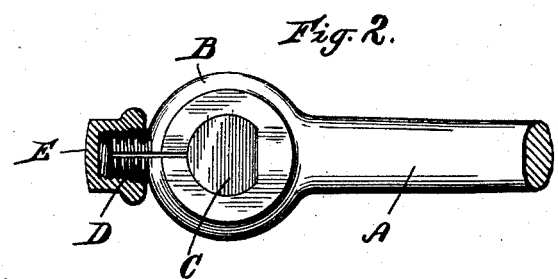
Witnesses,
John E. Wiles.
N. E. Oliphant
Inventor,
Frank H. Bolte
By H. G. Underwood
Attorney.

UNITED STATES PATENT OFFICE.

FRANK H. BOLTE, OF MILWAUKEE, WISCONSIN, ASSIGNOR TO THE SERCOMBE-BOLTE MANUFACTURING COMPANY, OF SAME PLACE.

CRANK-SECURING MEANS.

SPECIFICATION forming part of Letters Patent No. 483,342, dated September 27, 1892.

Application filed June 24, 1892. Serial No. 437,849. (No model.)

*To all whom it may concern:*

Be it known that I, FRANK H. BOLTE, a citizen of the United States, and a resident of Milwaukee, in the county of Milwaukee, and in the State of Wisconsin, have invented certain new and useful Improvements in Cranks; and I do hereby declare that the following is a full, clear, and exact description thereof.

My invention has for its object to provide detachable cranks that may be rigidly secured to their axes without the employment of any description of key or cotter, whereby I avoid the necessity of providing seats or openings for such devices, increase the strength of the cranks, and prevent them from working loose.

My invention therefore consists in certain peculiarities of construction and combination of parts hereinafter described with reference to the accompanying drawings and subsequently claimed.

In the drawings, Figure 1 represents a side elevation of a complete crank constructed according to my invention, and Fig. 2 a similar view of the same fitted to an axis and having its peculiar clamping-nut in section.

Referring by letter to the drawings, A represents a crank having its head B or that portion that is fitted to an axis C provided with a tapered and screw-threaded lug D, that may be at any point on the periphery of said head. The lug D and head B are split inward as far as the opening in which the axis C is fitted, and in practice this fit should be as accurate as possible in order to obtain the best results. The axis-opening in the crank may be of any preferred contour; but it is best to have it somewhat angular to prevent any possible slipping of said crank when under strain.

Engaging the tapered screw-threaded lug D is a nut E, having a corresponding taper and thread upon its interior, and the dimensions of said lug and nut are such that the latter may be forcibly run onto the former far enough to exert a clamping action that tends to reduce the area of the opening in the split crank-head B, whereby this head is bound tight on an axis previously engaged therewith.

By the construction above described I avoid weakening a crank by having key-seats or cotter-openings therein and prevent the stretching that is incident to cranks held in place by keys or cotters of any description.

Having now described my invention, what I claim as new, and desire to secure by Letters Patent, is—

1. A crank having a split head provided with a split and screw-threaded peripheral lug and a clamping-nut that engages the lug, substantially as set forth.

2. A crank having a split head provided with a split, tapered, and screw-threaded peripheral lug and a nut that is tapered and threaded upon its interior to engage with the lug, substantially as set forth.

In testimony that I claim the foregoing I have hereunto set my hand, at Milwaukee, in the county of Milwaukee and State of Wisconsin, in the presence of two witnesses.

FRANK H. BOLTE.

Witnesses:
N. E. OLIPHANT,
JOHN E. WILES.